Jan. 9, 1951     Y. THOMAS     2,537,802
TOOTHED ROLLER ASSEMBLY
Filed Aug. 15, 1947     2 Sheets-Sheet 1
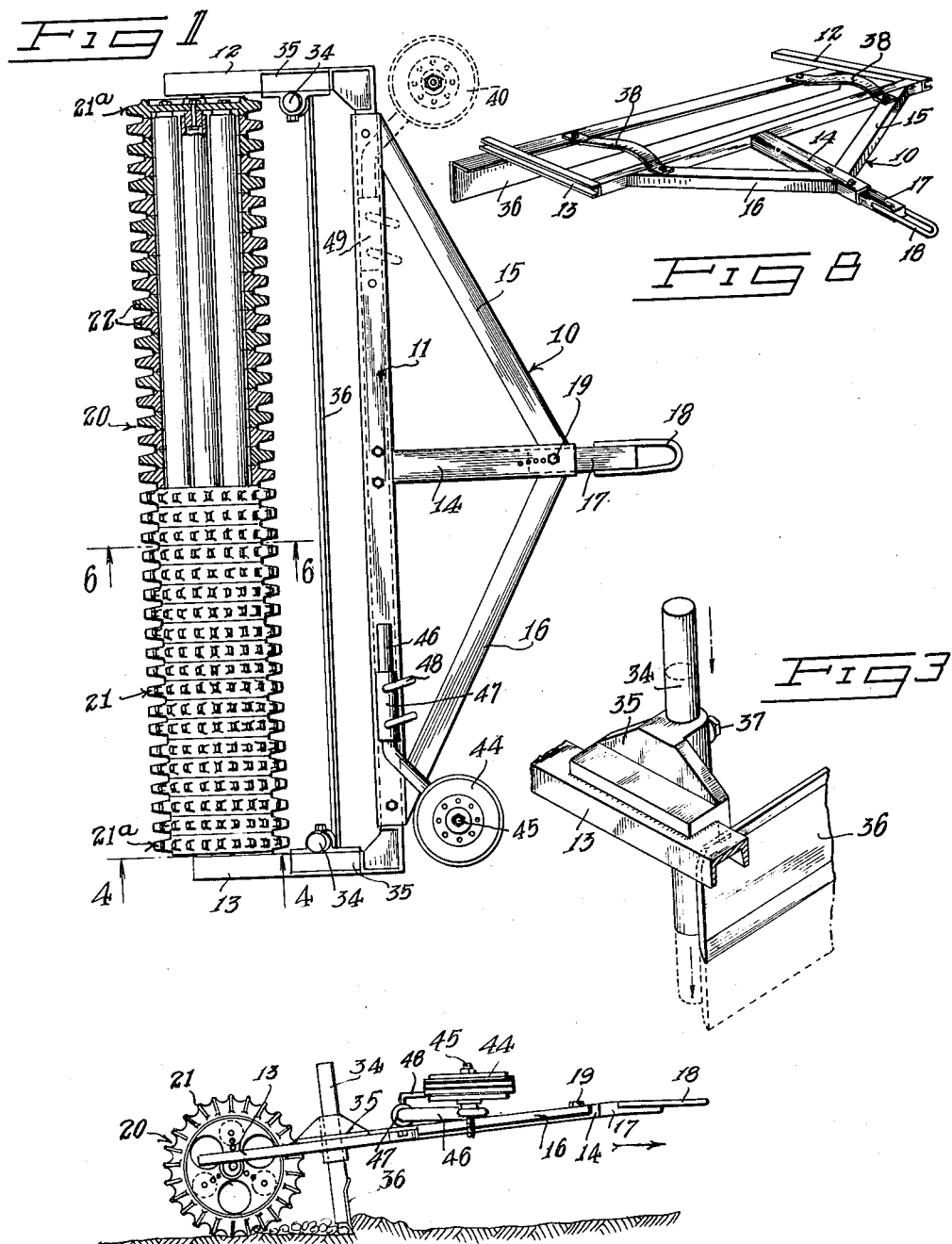
INVENTOR.
Yeppie Thomas
BY Lyon Lyon
ATTORNEYS Jan. 9, 1951      Y. THOMAS      2,537,802
TOOTHED ROLLER ASSEMBLY
Filed Aug. 15, 1947      2 Sheets-Sheet 2
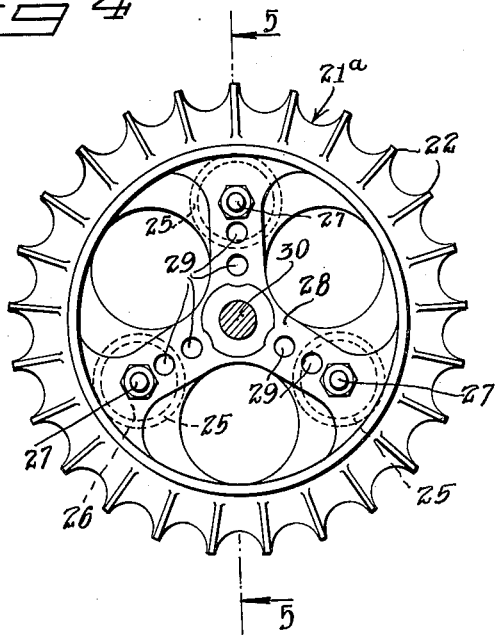
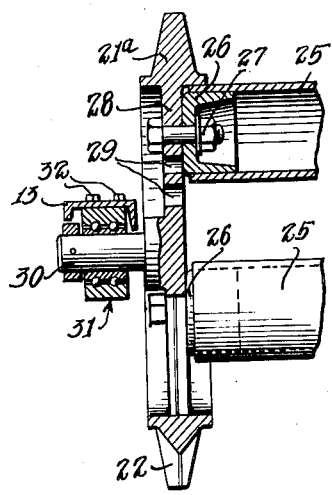
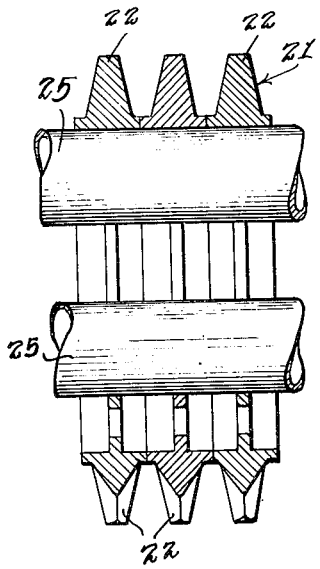
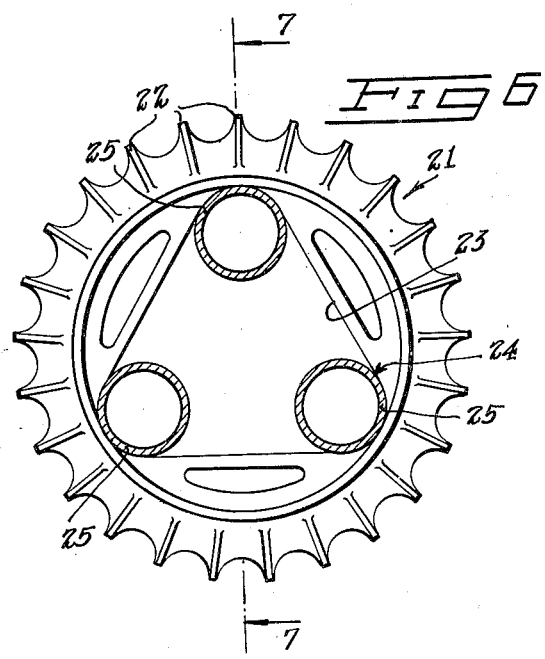
INVENTOR.
Yeppie Thomas
BY
Lyon & Lyon
ATTORNEYS

UNITED STATES PATENT OFFICE 2,537,802

TOOTHED ROLLER ASSEMBLY

Yeppie Thomas, Fresno, Calif.

Application August 15, 1947, Serial No. 768,896

5 Claims. (Cl. 55—77)

This invention relates to an agricultural implement, and is particularly directed to a roller type ground pulverizer. Agricultural devices of this type commonly employ a plurality of toothed rings which roll on the ground to break up the earth after plowing to pack the earth in preparation for seeding operations or for various other purposes. One of the outstanding advantages of roller type ground pulverizers is that the top soil is pulverized while air pockets which tend to dry out the sub-soil are eliminated.

The principal object of this invention is to provide an improved form of roller type ground pulverizer.

Another object is to provide a device of this type having a plurality of ground contacting rollers or rings adapted to rotate in unison and operating with self-cleaning action by reason of limited relative radial movement.

Another object is to provide a device of this type employing a rotatable spider which is encircled by a plurality of toothed ground contacting roller rings, the spider and rings cooperating to prevent relative rotation while permitting radial movement between adjacent rings, whereby the device is effective in operating over uneven ground.

Another object is to provide a ground pulverizer of this type in which an adjustment is provided to vary the extent of relative radial movement permitted between individual roller rings.

A more particular object is to provide an agricultural implement of this type having a ground contact scraper and leveler positioned in advance of a toothed roller assembly.

A still further object is to provide one or more horizontally disposed bumper wheels positioned forwardly of the roller assembly and at one side thereof which is adapted to contact trees, fence posts, etc., and protect them from injury.

Other objects and advantages will appear hereinafter.

In the drawings:

Figure 1 is a top plan view illustrating a preferred embodiment of my invention.

Figure 2 is a side elevation thereof.

Figure 3 is a fragmental perspective view illustrating details of mounting of the leveler on the frame.

Figure 4 is a sectional elevation taken substantially on the line 4—4 as shown in Figure 1.

Figure 5 is a sectional elevation taken substantially on the line 5—5 as shown in Figure 4.

Figure 6 is a sectional view taken on the line 6—6 as shown in Figure 1.

Figure 7 is a partial sectional elevation taken substantially on the line 7—7 as shown in Figure 6.

Figure 8 is a view showing a modified form of mounting for the leveler blade.

Referring to the drawings, the frame generally designated 10 includes a yoke-shaped member comprising a transverse member 11 having rearwardly extending arms 12 and 13 fixed thereon. A forwardly projecting square tube 14 is secured to the transverse member 11, and angle braces 15 and 16 are provided for stiffening the connection between the tube 14 and the member 11. The members 11, 12, 13, 14, 15 and 16 may be joined by any convenient means such as, for example, by welding. A tongue member 17 having an attachment piece 18 is received within the tube 14, and a bolt 19 is provided for securing the tongue 17 with respect to the tube 14 in any one of a plurality of positions, the bolt passing through aligned openings in the tube 14 and the tongue 17, as will be readily understood.

The arms 12 and 13 of the frame 10 are adapted for connection with the roller assembly generally designated 20. This assembly 20 includes a plurality of duplicate ground contacting toothed roller rings 21 and 21ª axially aligned and positioned in edge-to-edge relationship. Each of the rings 21 and 21ª is provided with a plurality of teeth 22 around its outer periphery which are adapted to break up clods and pulverize the top surface of the soil. Each of the intermediate rings 21 is provided with a non-circular opening 23 and, as shown in the drawings, this opening may be approximately triangular in shape. A spider member 24 is encircled by each of the rings 21 and this spider member is preferably constructed of a plurality of transversely extending pipes or tubes 25 which are fixed to end rings 21ª at their opposed ends. The tubes 25 parallel and extend in symmetrical relation with repect to the rotary axis of the roller assembly 20. A plug 26 is provided at each end of each tube 25 and a releasable bolt secures the plug to the flange 28 of each end ring 21ª. The bolt 27 may be passed through any one of a plurality of holes 29 provided in the flange 28 in order to vary the spacing between the tubes 25.

An outwardly extending trunnion 30 is fixed to each of the end rings 21ª and a bearing assembly 31 encircles each of the trunnions 30. The bearing assembly 31 is secured to the arms 12 and 13 on the frame 10 by means of the bolts 32.

The roller assembly 20 is built up by axially sliding the individual rings 21 over the tubes 25 before the assembly 20 is mounted between the arms 12 and 13.

It will be observed that the non-circular opening 23 in each of the intermediate rings 21 receives the parallel pipes 25 so that relative rotation between the rings 21 and pipes 25 is prevented. However, reference to Figures 4 and 5 shows clearly that considerable clearance may be provided between the pipes 25 and the non-circular opening 23 so that as the roller assembly 20 proceeds along the ground surface, the individual rings 21 are capable of considerable relative radial movement. This is an advantageous feature since it allows the rings to clear themselves of earth which might otherwise adhere to the roller assembly, and also enables the device to operate effectively over uneven ground.

A scraper and leveler blade 36 is mounted to extend transversely of the implement at a position in advance of the roller assembly 20, as clearly shown in Figure 2. The scraper blade 36 may be mounted on the frame 10 in any one of a number of different ways. As shown in Figures 1, 2 and 3, it may be provided with vertically extending supports 34 at its opposed ends which are adapted to be slidably received in brackets 35 mounted on the arms 12 and 13. A set screw 37 may be provided on each bracket 35 for clamping the supports 34 to hold the leveler at the desired height. As shown in Figure 8, the leveler blade 36 may be supported on the frame 10 by means of leaf springs 38 having their forward ends secured to the angle braces 15 and 16.

In order that the device may be utilized in orchards or in fields bordered by fences without danger of injuring the trees or fence posts, I prefer to provide a bumper wheel 44 which is disposed substantially horizontally and which is mounted at the extreme edge of the device in advance of the roller assembly 20. As shown in the drawings, the bumper wheel 44 may rotate on an axle 45 secured to the forward end of the arm 46. A boss 47 fixed to the frame member 11 slidably receives one end of the arm 46 and adjusting elements 48 are provided on the boss for fixing the arm 46 in the selected position. A duplicate boss 49 is provided on the opposite side of the frame 10 so that, if desired, the bumper wheel 44 and its arm 46 may be secured to the frame by means of the boss 49 and assume the position illustrated by the dotted lines 40. In certain operations, it may be desirable to employ bumper wheels on both sides of the device.

In operation, the scraper blade 36 is adjusted to the desired height, and the bumper wheel 44 is moved to the desired position. The tongue 17 is connected to a prime mover such as a tractor, not shown, by means of the connection fitting 18 and the device is rolled over the earth with the scraper blade 36 in advance of the roller assembly 20. Contact of the individual toothed rings 21 with the ground causes the roller assembly to turn within the bearings 28 while relative rotation between the rings and between each ring and the spider 24 is prevented by reason of the shape of the spider 24 and the shape of the openings 23 within the rings 21. There is sufficient clearance between each individual ring and the spider 24 to allow considerable independent radial movement between adjacent rings. Such movement is beneficial in that it enables the rings automatically to dislodge earth which might otherwise adhere to the entire assembly. The extent of such movement may be adjusted by changing the position of the bolts 27 in the holes 29.

Having fully described my invention, it is to be understood that I do not wish to be limited to the details herein set forth, but my invention is of the full scope of the appended claims.

I claim:

1. In an agricultural implement of the type described, the combination of a frame provided with a tongue, a roller assembly extending transversely of the frame, said roller assembly including radially spaced symmetrically positioned elements extending between end members fixed thereto, bearing means on the end members for rotatably mounting the roller assembly relative to the frame, a plurality of ground-contacting roller rings encircling the said elements in edge-to-edge relation, said rings each having a non-circular opening receiving said elements, whereby relative rotation between the roller rings and said elements is prevented.

2. In an agricultural implement of the type described, the combination of a frame provided with a tongue, a roller assembly extending transversely of the frame, said roller assembly including a spider comprising a plurality of parallel tubular elements extending between end members fixed thereto, outwardly projecting trunnions on the end members for rotatably supporting the spider on the frame, a plurality of ground-contacting roller rings encircling said tubular elements in edge-to-edge relation, said rings each having a non-circular opening loosely receiving said elements, whereby adjacent roller rings may have limited relative radial movement but are constrained to rotate with the spider.

3. In an agricultural implement of the type described, the combination of a frame provided with a tongue, a roller assembly extending transversely of the frame, said roller assembly including a spider comprising a plurality of parallel tubular elements extending between end members fixed thereto, outwardly projecting trunnions on the end members for rotatably supporting the spider on the frame, a plurality of ground-contacting roller rings encircling said tubular elements in edge-to-edge relation, said rings each having a non-circular opening receiving said elements, whereby relative rotation between the roller rings and said elements is prevented, and means on the end members for adjusting the spacing of the tubular elements.

4. In an agricultural implement of the type described, the combination of a frame provided with a tongue, a roller assembly extending transversely of the frame, means rotatably connecting the roller assembly to the frame, said roller assembly including a plurality of elongated supporting elements and a plurality of ground-contacting roller rings positioned in edge-to-edge relation, and having central openings to receive the supporting elements, spacer members acting to maintain the supporting elements in radially spaced positions, and means on said spacer members for varying the relative radial positions of the supporting elements.

5. In an agricultural implement of the type described, the combination of a frame, a roller assembly extending transversely of the frame, means rotatably connecting the roller assembly to the frame, said roller assembly including a plurality of elongated supporting elements encircled by a plurality of ground-contacting roller rings in edge-to-edge relation, spacer members on said assembly, and means adjustably mounting the supporting elements on the spacer members for relative radial movement whereby the roller rings may be held in coaxial relationship or permitted to have relative radial movement as desired.

YEPPIE THOMAS.

REFERENCES CITED

The following references are of record in the file of this patent:

UNITED STATES PATENTS

| Number | Name | Date |
| --- | --- | --- |
| 324,208 | Alexander | Aug. 11 1885 |
| 1,190,259 | Henderson | July 4, 1916 |
| 1,637,424 | Morrow | Aug. 2, 1927 |
| 2,440,642 | Oswald | Apr. 27, 1948 |